May 13, 1969   E. J. BLANZY ET AL   3,443,591

GAS VALVE STRUCTURE

Filed March 23, 1967   Sheet 1 of 2

INVENTORS
EUGENE J. BLANZY &
EVERETT W. CARLSON
BY
Barnes, Kisselle, Laisch & Choate
ATTORNEYS

United States Patent Office 3,443,591
Patented May 13, 1969

3,443,591
GAS VALVE STRUCTURE
Eugene J. Blanzy and Everett W. Carlson, Detroit, Mich., assignors to Lincoln Brass Works, Detroit, Mich., a corporation of Michigan
Filed Mar. 23, 1967, Ser. No. 625,407
Int. Cl. F16k 5/12
U.S. Cl. 137—625.3            7 Claims

ABSTRACT OF THE DISCLOSURE

Clicking washer device which indicates rotary positions of a valve plug by audible clicks or resistance to turning. Indicated positions are determined by location of milled shoulders on valve body which are engaged by washer projections. Valve porting provides uniform gas flow rate over a span of rotation of valve plug adequate to encompass incidental variations of position at which position indicator functions.

---

This invention relates generally to valves of the type used in domestic gas ranges. More particularly the invention relates to the type of valve which embodies a clicking washer device to give indications of various positions of the valve, either by audible clicks or by resistance to turning of the valve plug. The invention also involves porting in the valve plug which provides certain gas flow rates at the various indicated positions.

In conventional valves of this type, the clicking washers are spring biased axially against each other and have axial projections and recesses which are snapped into engagement by the spring bias when they are brought into alignment to give an audible indication of a valve position. The spring bias resists disengagement of the projections and recesses and this resistance may also be utilized to provide a valve position indication. It is also conventional to provide a radial lug on one of the washers to engage shoulders on the valve body at off and full-on positions of the valve.

Heretofore in order to provide position indications at different rotary positions of the valve plug for different models of valves it has been customary to provide the washers with different arrangements of interengageable projections and recesses. These washers are most economically made as stampings which means that for each variation in a washer separate dies must be provided. The dies are expensive.

An object of this invention is to provide a relatively simple, inexpensive valve structure improved so that a single standardized set of clicking washers can be used to provide various arrangements of position indications as desired in valves of different types or models. A related object of the invention is to provide a porting arrangement which results in uniform gas flow rates over a span of rotation of the valve plug at various indicated positions, this span being adequate to encompass incidental variations of position at which the clicking washers function, thereby insuring a predetermined gas flow rate at the indicated positions.

In accordance with the invention, the valve body is provided with two sets of shoulders forming stops respectively for radial lugs on the two washers. The location of the shoulders is varied from one valve model to another to provide indications of different combinations of valve plug positions. Certain of the ports in the valve plug have relatively small metering portions and have enlargements which register with the valve inlet so that after the metered flow is attained, it will remain uniform even though the valve plug is rotated a few degrees before the clicking washers function.

One form of the invention is illustrated in the accompanying drawings.

Figure 1:
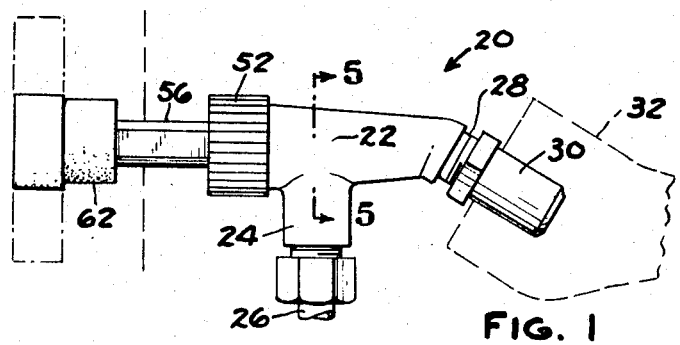
FIG. 1 is an elevational view of a typical valve embodying the present invention.

Shown in FIG. 1 is a valve 20 embodying the present invention. The valve has a body 22 provided with an inlet nipple 24 connectable to a fuel gas supply line 26 and an outlet nipple 28 provided with a conventional hood 30 containing an orifice, not shown, through which fuel gas is injected into a mixing tube 32. Body 22 defines an internal tapered chamber 34. Nipples 24 and 28 define inlet and outlet passageways 36 and 38 respectively.

A tapered valve plug 40 is held rotatably seated in chamber 34 by a compressed spring 42 acting against a shoulder 44 on the plug and reacting against an assembly of washers 46, 48, 50 contained by a cap 52 threaded onto the valve body at 54. Valve plug 40 has an operating stem 56 which projects through an opening 58 in the valve cap and has an acircular end 60 insertable within a mating opening in an operating handle 62.

Valve plug 40 is provided with three ports 64, 66, 68 longitudinally aligned with inlet passageway 36 so that at different rotative positions of the plug, the inlet is placed in communication with an internal gasway 70 in the valve plug. Gasway 70 has an open end 72 which communicates with outlet passageway 38.

Port 64 has a small diameter inner portion 74 and an enlargement 76 at its outer end, this enlargement preferably having round shape. Similarly, port 66 has a small diameter inner portion 78, and an enlargement at its outer end, this enlargement comprising a circular portion 80 and a tail portion 82 which extends generally linearly toward port 64. Tail 82 has a gradually varying cross section and preferably comprises a tapered V-shaped recess extending along a chord of the valve plug with the larger end of the V intersecting circular portion 80 of the enlargement. Port portions 74 and 78 in effect are metering ports each of which limits the flow of gas into gasway 70 to a predetermined maximum. Metering port 78 is larger than metering port 74 as shown. Port 68 is relatively large as compared to metering ports 74 and 78 as shown.

Figure 5:
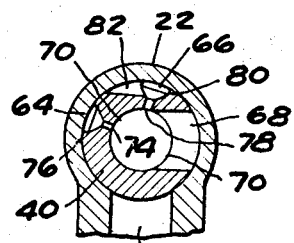
FIG. 5 is a sectional view on line 5—5 of FIG 1 on a somewhat enlarged scale illustrating the off position of the valve.
Figure 2:
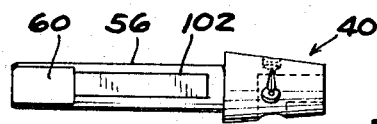
FIG. 2 is an elevational view of the valve plug and operating stem separately.

The valve is in off position when the parts are in the condition illustrated in FIG. 5 wherein valve plug 40 prevents the flow of gas from inlet 36 to gasway 70. To turn the valve on, plug 40 is rotated counterclockwise as the drawings are viewed, and at about 60° rotation, enlargement 76 of port 64 begins to register with the inlet 36. The effective size of the opening defined by the wall of inlet 36 and portions of enlargement 76 registering therewith gradually increase to the point where this effective opening is about the same size as metering port 74.

Figure 6:
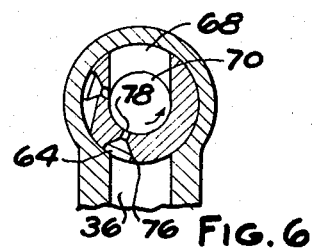
FIGS. 6–10 are views similar to FIG. 5, but illustrating various positions of the valve plug as the valve is turned to full-on position.
Figure 3:
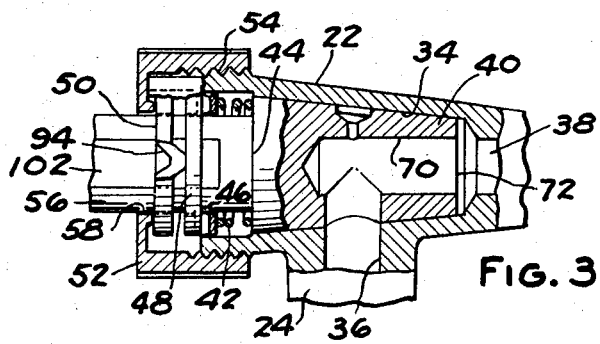
FIG. 3 is an enlarged fragmentary longitudinal sectional view of the valve.
Figure 17:
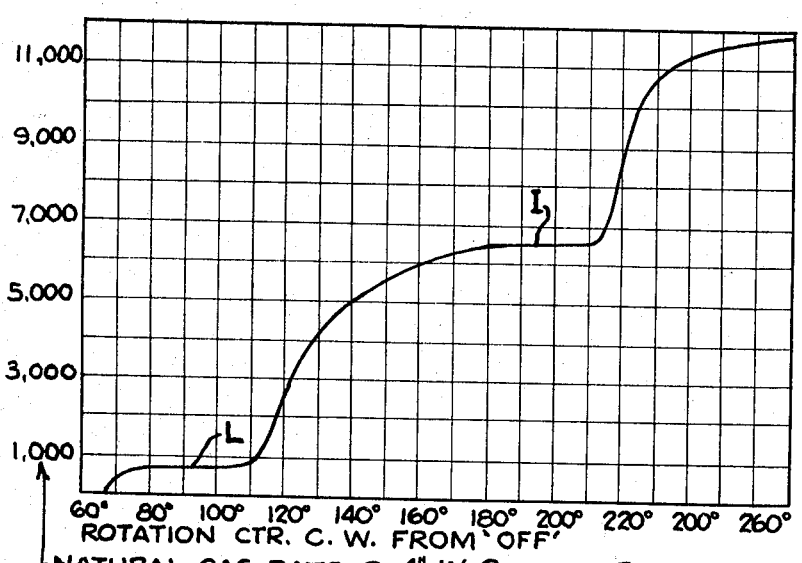
FIG. 17 is a graph illustrating the gas flow rates at various positions of the valve plug.

This occurs at approximately 80° rotation as shown in FIG. 17. The valve is now at its low on position wherein the rate of flow, typically about 750 B.t.u. per hour, is adequate to maintain combustion but is inadequate for ignition of the gas at the burner which the valve supplies. Enlargement 76 is large enough so that upon continued rotation of the valve plug through about 20°, the gas flow remains substantially uniform at the metered rate. FIG. 6 illustrates the position of the valve plug within this range of uniform flow. The uniform flow rate is represented by a horizontally extending portion L of the graph shown in FIG. 17.

Figure 7:
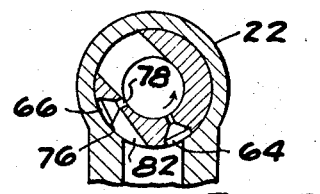
Figure 4:
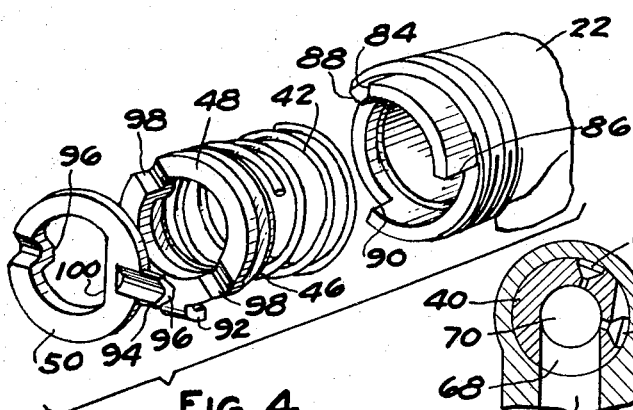
FIG. 4 is a fragmentary perspective exploded view illustrating components of the position indicating device.

Upon continued rotation of the valve plug toward the FIG. 7 position tail port 82 begins to register with inlet 36 and somewhat later port 64 begins to leave registry with the inlet. The rate of increase of gas flow through the tail port as the plug moves is greater than the rate of decrease through port 64 as the latter leaves registry with the inlet. Consequently, the gas flow through the valve increases gradually to the point where it attains a maximum determined by the size of metering port 78. This occurs at about 180° rotation (FIG. 8) and the valve is now at an intermediate position in which the rate of flow of gas, typically about 6500 B.t.u. per hour, is adequate for ignition at the burner. Port enlargements 80, 82 are large enough so that the valve can be turned through an additional range of about 20° without varying the rate of gas flow as shown by the horizontal portion I of the graph.

Upon continued rotation of the valve plug, port 66 begins to leave registry with inlet 36 while large port 68 begins to register therewith. Here again, the rate of increase through the large port is greater than the rate of decrease through port 66, so that the gas flow increases to about 12,000 B.t.u. at about 270° rotation when the valve plug attains the full-on position of FIG. 10. The valve is turned off by rotating plug 40 clockwise from the FIG. 10 position to the FIG. 5 position and the decreasing gas flow rate curve is substantially the same as the increasing gas flow curve when the valve was turned on.

The position indicating device for valve plug 40 includes click washers 48, 50, spring 42, a pair of shoulders 84, 86 on the valve body and another pair of shoulders 88, 90 on the valve body. Shoulders 84 and 86 are axially and angularly offset from shoulders 88 and 90 as shown. In the specific arrangement illustrated, shoulders 84, 86 are spaced angularly about 270°, while shoulders 88, 90 are spaced angularly about 90°. Washer 48 has a radially projecting lug 92, disposed between and engageable with shoulders 88 and 90. Washer 50 has a radial lug 94 disposed between and engageable with shoulders 84 and 86. Washer 50 has axial projections 96 engageable within complementary axial recesses 98 in washer 48. The projections and recesses are configured so that they can be cammed out of engagement against the bias of spring 42 which urges washers 48 and 50 into axial engagement.

Washer 50 has an internal flat 100 engaged with a flat 102 on operating stem 56 of the valve plug so that when stem 56 is turned washer 50 is constrained to turn with it. Washer 48 is free to turn relative to valve stem 56. Frictional engagement between washers 48 and 50 under the bias of spring 42 provides a drive connection by which washer 50 turns washer 48 except when turning of washer 48 is arrested by engagement of lug 92 thereon with shoulder 88 or 90.

Figure 11:
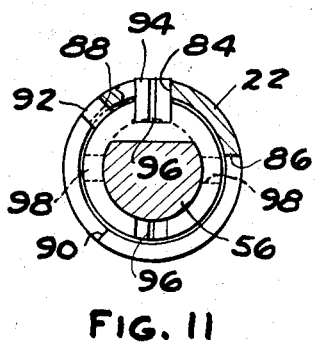
FIG. 11 is an end view of the valve body with the cap removed showing the relation of the position indicating components in off position of the valve, the valve stem being shown in section.

In use it may be assumed that valve 20 is initially in the off position of FIG. 5. The clicking washers are in the FIG. 11 position with lug 92 of washer 48 engaged against shoulder 88 and lug 94 of washer 50 engaged against shoulder 84. Axial projections 96 on washer 50 are 90° displaced from recesses 98 in washer 48.

Figure 12:
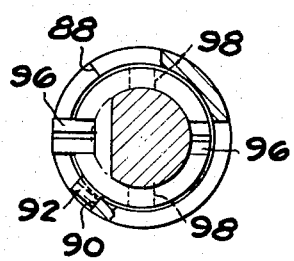
FIGS. 12–16 are similar to FIG. 11, but showing relations of the parts in different positions of the valve.

When the valve is turned 90° counterclockwise from the FIG. 5 position, to the FIG. 6 position, operating stem 56 turns washers 50 and 48 90° counterclockwise to the position of FIG. 12 wherein lug 92 engages shoulder 90. Since the flow of gas at this position is insufficient to initiate combustion at the burner, no position indication is given by the clicking washers at this position. The operator continues to turn the valve counterclockwise to the position of FIGS. 8 and 13. During this 90° rotation, engagement of lug 92 with shoulder 90 prevents movement of washer 48 while movement of washer 50 continues. At the FIG. 13 position projections 96 on washer 50 align with and are snapped by spring 42 into engagement with recesses 98 on washer 48. This gives an audible click which indicates that the valve is now at the position I wherein gas is furnished to the burner at a rate sufficient for ignition.

Figures 9, 10:
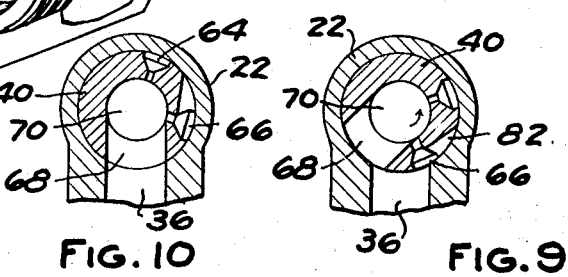
Figure 14:
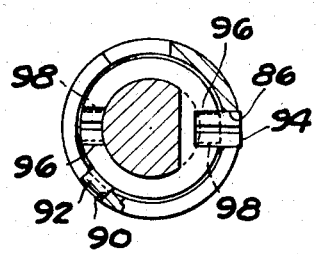

Upon continued counterclockwise rotation, projections 96 are cammed out of engagement with recesses 98 against the bias of spring 42 and the valve plug and washer 50 move to the full-on position of FIGS. 10 and 14 wherein rotation of the parts is halted by engagement of lug 94 against shoulder 86.

Figure 15:
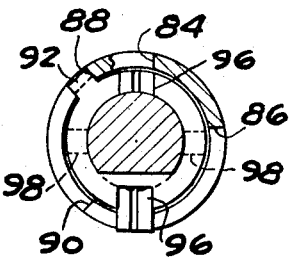
Figure 16:
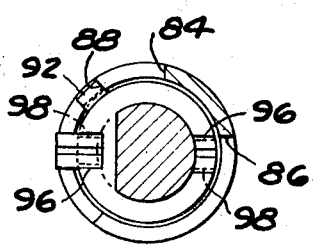

During the first 90° of clockwise turn-down movement of the valve from full-on position, washer 50 drives washer 48 until lug 92 thereon engages shoulder 88 as shown in FIG. 15. The valve is again at the intermediate position I. Upon further clockwise movement of the valve plug, washer 50 moves independently of washer 48 until projections 96 align with and snap into engagement with recesses 98 under the bias of spring 42. This produces an audible indication of the low position L of the valve and the clicking washers are in the position shown in FIG. 16. Upon further turn-down movement washer 48 remains at the FIG. 16 position because of engagement of lug 92 with shoulder 88 while projections 96 are cammed out of recess 98 and lug 94 returns clockwise to engagement with shoulder 84 at the off position of the valve.

Because of manufacturing tolerances of the valve and clicking washer components and because of variations in the manner in which individual persons may turn operating handle 62 and the valve, there may be ten to fifteen degrees difference in the rotative positions at which the clicking washers provide their audible indication. The porting in valve plug 40 which provides uniform flow rates L and I over a rotative range of about 20° of the valve plug insures that when the clicking washers function the valve plug will be at a proper position for delivering gas to a burner at the rate determined by metering port 74 or 78 as the case may be.

Figure 8:
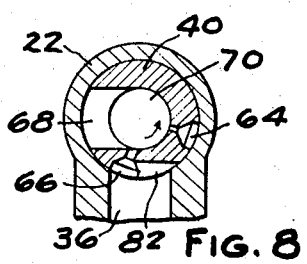
Figure 13:
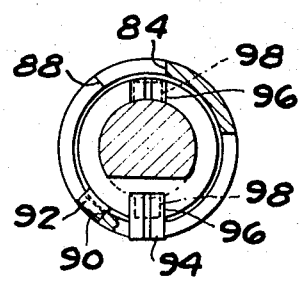

In some instances, the user will want to turn the valve to low position L directly after ignition of the gas at the ignition position of FIGS. 8 and 13. In this situation, the clicking washers will be turned counterclockwise from the FIG. 13 position to the FIG. 16 position at which lug 92 engages shoulder 88 and rotation of washer 48 is arrested. Since projections 96 and recesses 98 are already interengaged, the position indication will be provided in the form of resistance to further turning of washer 50 and the valve stem. This resistance results from the resistance to camming disengagement of the lugs 96 and recesses 98 against the bias of spring 42. Similarly, if the valve should be turned up from the FIG. 16 position to the FIG. 13 position wherein counterclockwise movement of washer 48 is arrested by engagement of lug 92 against shoulder 90, the indication of position I will be in the form of resistance to further counterclockwise turning of the valve.

In turning the valve counterclockwise beyond the FIG. 12 position or clockwise beyond the FIG. 15 position some resistance occurs when lug 92 engages shoulder 90 or 88 but this resistance is so slight that it will not be confused with the resistance to disengagement of projections 96 and recesses 98. The smaller resistance may be used, however, to provide an indication of position I when the valve is turned down from the full-on position of FIG. 14.

With the structure described the extent of rotation of valve plug 40 between off and full-on positions can be varied merely by milling shoulders 84 and 86 at different angular locations on valve body 22. Also the rotative positions of the valve plug at which low position L and ignition position I are indicated or signaled can be varied by milling shoulders 88 and 90 at different angular locations on the valve body. The construction and configuration of washers 48 and 50 need not be varied from one valve model or type to another.

In manufacture it is a relatively simple matter to set up milling machinery to mill each of shoulders 84, 86, 88 and 90 at a desired location for all of the valves in a particular production run. The invention eliminates the considerably more exensive requirement of making a new set of dies for the manufacture of clicking washers having a different configuration for each different valve type or model.

The graph of FIG. 17 illustrates a typical curve for a valve utilizing natural gas under pressure of 4 inches water column. Valves according the present invention are equally well adapted to use with different kinds of gas and gas under different pressures.

We claim:
1. A gas valve having a rotatable member provided with porting to regulate gas flow from off position to full-on position and intermediate positions, improved controlling and indicating structure which comprises,
   two elements having generally the form of washers, one of which is constrained for movement with said member and the other of which is mounted for movement relative to said one element,
   said elements being spring biased axially together so that a frictional drive connection is provided therebetween,
   said elements being contained on said body by a cap,
   said body having one set of angularly spaced shoulders and said one element having first stop means engageable therewith respectively at off and full-on positions of said valve member,
   said body having another set of angularly spaced shoulders which are axially displaced and angularly offset from the shoulders of said one set,
   said other element having second stop means engageable with the shoulders of said second set to arrest movement of said other element by said one element in opposite directions,
   the range of movement of said one element between said one set of shoulders being greater than the range of movement of said other element between said other set of shoulders,
   said range of movement of said other element being great enough so that responsive to said frictional drive connection it is movable with said one element to one of said positions of said valve member and to an intermediate position thereof,
   said elements being provided with means interengageable under and disengageable against said spring bias responsive to movement of said one element relative to said other element when movement of the latter is so arrested whereby to provide physical indications of intermediate positions of said valve member.
2. The combination defined in claim 1 wherein the shoulders of said one set are disposed axially outwardly of the shoulders of said other set,
   said first and second stop means comprising projections on said washers,
   the projection on said other washer being engaged against the respective shoulders of said other set when the projection on said first washer is engaged against the shoulders of said first set, respectively, in off and full-on positions of said valve body.
3. The combination defined in claim 1, wherein in movement of said valve member from off position toward full-on position said porting provides a first intermediate position in which gas flow is inadequate to initiate combustion but adequate to maintain combustion and a second intermediate position in which gas flow is adequate to initiate combustion,
   said elements in movement of said valve member from said off position toward said full-on position being movable together in a range of movement at the end of which said second stop means engages a shoulder of said second set at said first intermediate position,
   said one element thereafter being movable independently of said other element through another range at the end of which said interengageable means interengage at said second intermediate position to provide a first position indication in turning said valve on,
   said interengaged means being disengaged responsive to movement of said valve member and one element from said second intermediate position toward full-on position but remaining interengaged upon return movement thereof through said other range of said one element,
   said second stop means being returned to a condition in which it is engaged with the other shoulder of said second set responsive to return movement of said one element toward said first intermediate position,
   under said condition and when said interengagable means are disengaged, said interengageable means being interengageable responsive to return movement of said one element independently of said other element to provide a position indication at said first intermediate position of said valve member,
   under said condition and when said interengageable means remain so interengaged, said elements and spring bias being cooperable to resist movement of said one element from said first intermediate position toward off position and thereby providing an indication of said first intermediate position of said valve member.
4. The combination defined in claim 3 wherein, under said condition and when said interengageable means are engaged and said valve member is at said first intermediate position, said elements and spring bias are cooperable upon turning said valve member to said second intermediate position to resist movement of said one element independently of said other element toward said full-on position, thereby providing an indication of said second intermediate position of said valve member.
5. The combination defined in claim 1 wherein said valve body has an inlet and said porting comprises first, second and third ports which successively communicate with said inlet in movement of said valve member from said off position to said full-on position,
   each of said first and second ports having a relatively small flow metering portion and having an enlarged portion which registers gradually with said inlet for gradually varying the gas flow rate therethrough in one range of movement and for maintaining a generally uniform metered flow rate therethrough in another range,
   each of said other ranges of movement defining one of said intermediate positions of said valve member and having a magnitude adequate to span incidental variations in the range of movement in which said elements provide the respective indications of position of said valve member.
6. In a gas valve having a body with an inlet and an outlet and having a rotatable valve member provided with an internal gasway and first, second and third ports which successively place said inlet and outlet in communication upon movement of said valve member from off position to a low position, intermediate position, and full-on position, improved structure wherein,
   said ports are disposed substantially in the same radial plane and each has an axis which extends sub- stantially radially from said gasway to the exterior of said valve member, each of said first and second ports having a relatively small diameter flow-metering portion which opens into said gasway, said first port having a first substantially circular enlargement and said second port having a second substantially circular enlargement, said enlargements opening at the exterior of said valve member, said second enlargement having a portion which extends generally linearly from said second port toward said first port, said first enlargement registering gradually with said inlet for gradually increasing the gas flow rate through said first port in one range of movement toward full-on position and for thereafter maintaining a generally uniform metered rate of flow therethrough in another range of such movement, said other range of movement defining said low position of said valve member, said linear portion of said second enlargement registering gradually with said inlet for gradually increasing the gas flow rate through said second port in one range of such movement and for thereafter maintaining a generally uniform metered rate of flow therethrough in another range of movement, said other range of movement of said second port defining said intermediate position of said valve member, said metering portion of said second port being larger than said metering portion of said first port, said inlet and enlargements being positioned and dimensioned so that upon movement of said valve member from said low position toward said intermediate position said linear portion enters registry with said inlet before said first enlargement leaves registry therewith and the effective size of said second port increases more rapidly than the decrease of effective size of said first port, whereby to provide a gradual increase in the rate of gas flow from said low position to said intermediate position.

7. In combination with the structure defined in claim 6, a valve position indicating mechanism constructed and arranged to provide a physical indication of the position of said valve member when said valve member is disposed within each of said other ranges of movement thereof.

References Cited

UNITED STATES PATENTS

| | | | |
|---|---|---|---|
| 2,572,507 | 10/1951 | Mueller | 251—297 X |
| 2,590,550 | 3/1952 | Lamar | 251—297 |
| 2,694,412 | 11/1954 | Jaros. | |
| 2,987,078 | 6/1961 | Du Perow | 137—625.32 X |

ARNOLD ROSENTHAL, *Primary Examiner.*

U.S. Cl. X.R.

137—625.32; 251—284, 297